United States Patent

Prakash et al.

[11] Patent Number: 5,908,685
[45] Date of Patent: *Jun. 1, 1999

[54] ELASTOMERIC COMPOSITE STRUCTURE

[75] Inventors: Amit Prakash, Hudson; Thomas Reed Oare, Suffield; Gary Edwin Tubb, Copley; Robert Edward Hall, Silver Lake, all of Ohio

[73] Assignee: The Goodyear Tire & Rubber Company, Akron, Ohio

[ * ] Notice: This patent is subject to a terminal disclaimer.

[21] Appl. No.: 08/865,449

[22] Filed: May 29, 1997

[51] Int. Cl.$^6$ .................................................. B32B 25/02
[52] U.S. Cl. ................. 428/212; 428/295.4; 428/298.1; 428/902; 428/300.4; 152/556; 152/557; 152/558
[58] Field of Search .............................. 428/295.4, 298.1, 428/212, 902, 300.4; 152/548, 558, 556, 557

[56] References Cited

U.S. PATENT DOCUMENTS

| | | | |
|---|---|---|---|
| 2,541,506 | 2/1951 | Cuthbertson et al. | 154/14 |
| 3,607,592 | 9/1971 | Jenkins | 161/57 |
| 3,643,723 | 2/1972 | Mukai et al. . | |
| 3,900,627 | 8/1975 | Angioletti et al. | 428/114 |
| 4,177,852 | 12/1979 | Merli et al. . | |
| 4,741,726 | 5/1988 | Zarife et al. | 474/268 |
| 4,770,929 | 9/1988 | Nobumasa et al. | 428/284 |
| 4,774,117 | 9/1988 | Oefner et al. | 428/71 |
| 5,096,772 | 3/1992 | Snyder | 428/295 |
| 5,244,436 | 9/1993 | Kurokawa | 474/260 |
| 5,599,604 | 2/1997 | Goettsch et al. | 428/105 |

*Primary Examiner*—Marion McCamish
*Assistant Examiner*—Elizabeth M. Cole
*Attorney, Agent, or Firm*—David L King

[57] ABSTRACT

An elastomeric composite structure 45 having two arrays of parallel cords 41, 43, each array of cords 41,43 being of different modulus or percent elongation. The array of cords 41,43 are spaced and provide different bending stiffness dependent on the direction of the applied load.

7 Claims, 4 Drawing Sheets

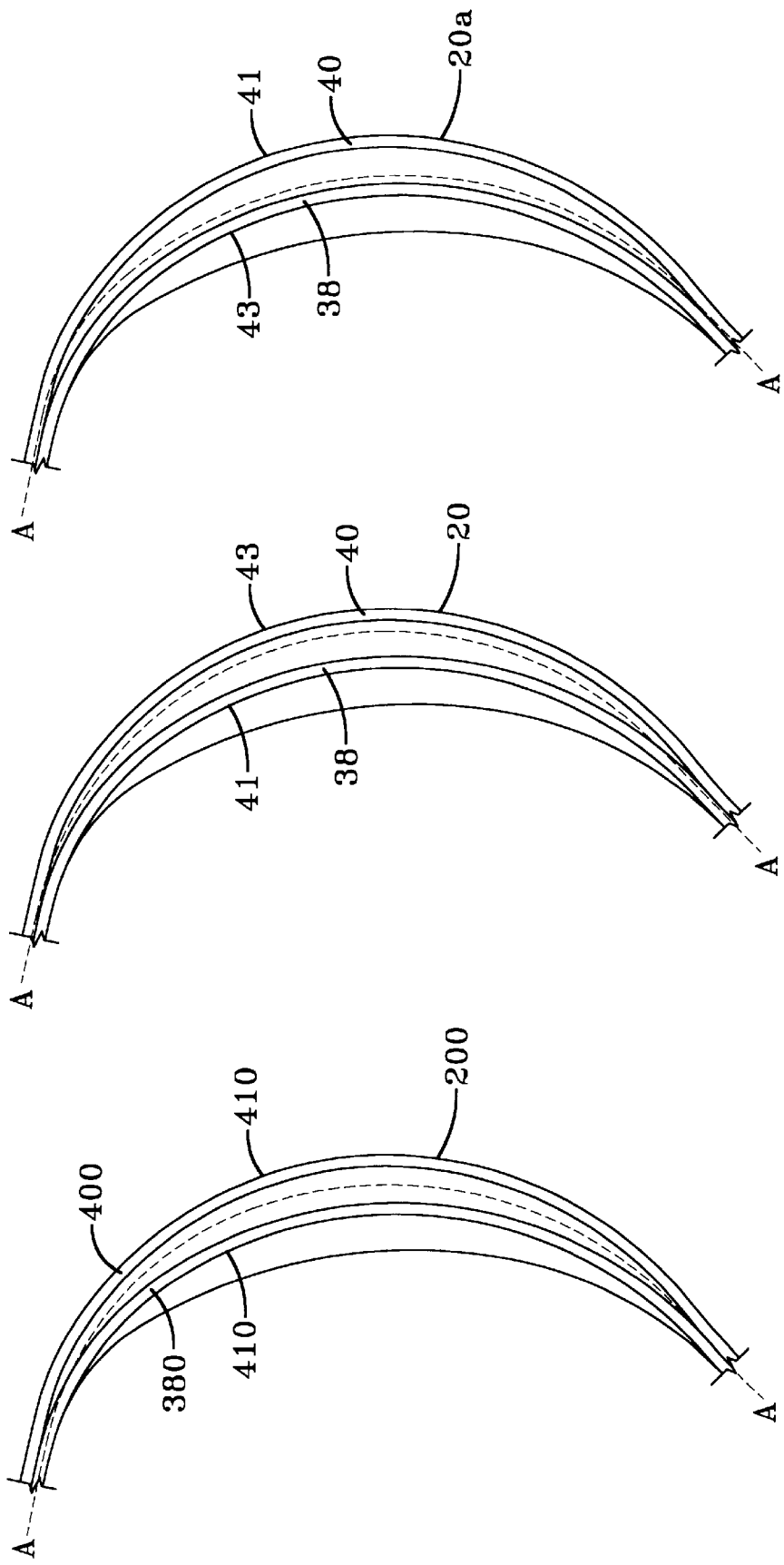

ELASTOMERIC COMPOSITE STRUCTURE

TECHNICAL FIELD

This invention relates to cord reinforced rubber articles.

BACKGROUND ART

Elastomeric materials reinforced with arrays of parallel layers juxtaposed to achieve increased tensile strength are well known in the art.

Power transmission belts as described in U.S. Pat. No. 5,244,436 to Kurokawa being an example. This patent discloses a v-belt comprising a plurality of longitudinally extending load-carrying cords embedded in an adhesive rubber layer; a compressing section having a plurality of laterally extending cords embedded in a second rubber layer; and a reinforcing rubber layer interposed between said layers to maintain a space between and thereby prevent inadvertent contact between laterally extending cords and load-carrying cords.

Other products such as conveyor belts, tires and hoses are similarly cord reinforced.

U.S. Pat. No. 3,607,592 discloses a portable rubber platform having a ply of rubberized steel cord 3 and 6 spaced by a layer of transverse textile members to achieve a one-way longitudinal rigidity. That invention related to portable platforms suitable for use as, for example, temporary bridges, catwalks and other walkways, and temporary roads on unfirm ground or swamps.

According to that invention a portable platform comprised a flexible composition having embedded therein a composite reinforcement comprising a textile reinforcement together with at least two layers of individually flexible transverse substantially inextensible metal cords, the metal cords in each layer lying substantially parallel with each other and substantially at right angles to the length of the platform, the separation of the transverse metal-cord layers being sufficient to confer a substantial degree of transverse rigidity upon the platform as a whole, and an interposed textile constituent of the composite reinforcement being disposed between each transverse metal-cord layer and the adjoining transverse metal-cord layer.

According to one aspect of that invention, a portable platform as described above had a composite reinforcement including a layer of longitudinal substantially inextensible metal cords lying substantially parallel with each other and with the length of the platform, said layer of longitudinal metal cords being disposed between an interposed textile constituent of the composite reinforcement and the layer of transverse metal cords which lies closest to the load-bearing surface of the platform.

The longitudinal metal cords were either continuous or discontinuous. When they are discontinuous they may be in parallel, overlapping relationship with each other. The discontinuous metal cords may be of any convenient lengths.

Usually the metal cords are steel cords. The steel cords preferably had a percentage extensibility of less than 5 percent. Suitable cords are composed of intertwisted strands of steel wire; for example, the cords may be composed of from six to 24 strands of steel wire of about 0.001 to 0.010 inch diameter. The cords were normally arranged in close side-by-side relationship and may suitably be arranged at a density of from eight to 24 cords per inch.

Preferably the composite reinforcement consisted of two layers of transverse steel cords with a single layer of textile reinforcement between them and a layer of longitudinal steel cords disposed between the textile layer and the layer of transverse steel cords which lies closer to the load-bearing surface of the platform.

This prior art invention provided a portable platform which can be erected simply by applying moderate tension e.g. about 50–80 pounds per inch from supports at the ends. The platform has remarkable transverse rigidity, so that sagging of the edges does not occur to any undesirable extent when a person or vehicle stands on or moves along the platform with weight acting at the edges of the platform, and so that twisting of the platform is limited. The platform could be rolled up and transported in convenient rolls.

In addition, the layer of longitudinal metal cords above the textile reinforcement gives longitudinal rigidity with respect to loads acting down upon the load-bearing surface of the platform.

Continuous longitudinal metal cords also added to the tensile strength of the platform whereas when discontinuous longitudinal metal cords were used, though they give longitudinal rigidity to the platform, the tensile strength is then provided solely by the textile reinforcement. Because of the substantially inextensible nature of the metal cords longitudinal sagging cannot occur even when the metal cords are discontinuous unless the textile reinforcement below the discontinuous longitudinal metal cords stretches appreciably which requires considerable force. Nevertheless the platform may be easily rolled up with the load-bearing surface outermost in the roll because bending of the platform in this direction merely requires circumferential compression of the textile reinforcement below the inextensible metal cords.

The present invention described herein has discovered a novel and useful way of creating a composite structure having a difference in bending stiffness created by a change in modulus between two spaced distinct arrays of parallel cords or by a change in the percent elongation of the cords.

SUMMARY OF THE INVENTION

A composite elastomeric cord reinforced structure 45 has a first outer surface 42 and a second outer surface 44. The first and second surfaces 42,44 are spaced. Within the elastomeric structure 45 are two distinct arrays of parallel cords 41,43. The first array of parallel cords 41 has a first modulus E of X. The second array of parallel cords 43 have a second modulus E greater than X preferably about 10 Gfa. The cords 41,43 of the first and second array are encapsulated in the elastomeric material. The cords 41,43 of both arrays are substantially parallel and similarly oriented or aligned relative to the cords of the other array, the first array of cords 41 being spaced from the second array of cords 43. The first array of cords 41 are located near the first surface 42, while the second array of cord 43 are located near the second surface 44. The composite structure 45 has a bending stiffness transverse to the array of cords 41,43 and generally normal to the first and second surfaces 42,44 greater in one direction than in the other.

The number of cords 41 of the first array can be greater than, the same as or less than the number of cords 43 of the second array.

The cords 43 of the second array are preferably substantially inextensible and have a percent elongation under load less than the cords 41 of the first array.

BRIEF DESCRIPTION OF THE DRAWINGS

FIGS. 3A, 3B and 3C show the composite sidewalls structures in a schematic view of the tires of FIG. 2A, 2B and a prior art tire.

DETAILED DESCRIPTION OF THE INVENTION

Figure 1A:
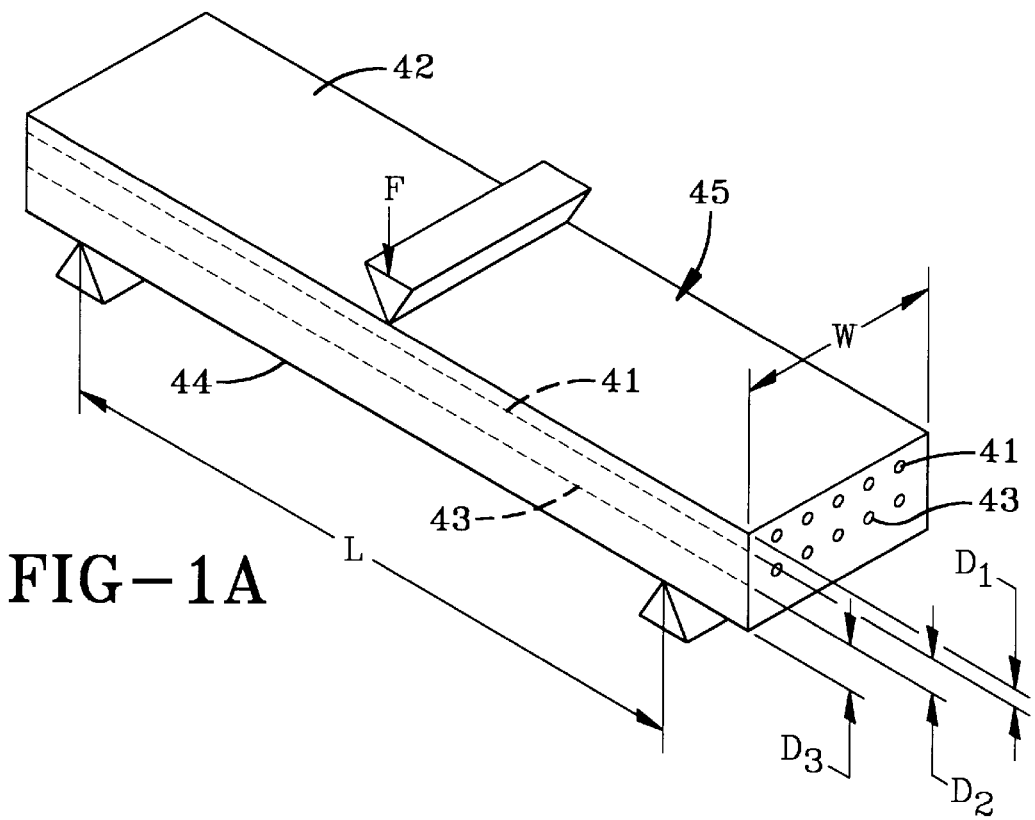
FIGS. 1A and 1B shows the composite structure being transversely loaded on each first and second surface respectively.
Figure 1B:
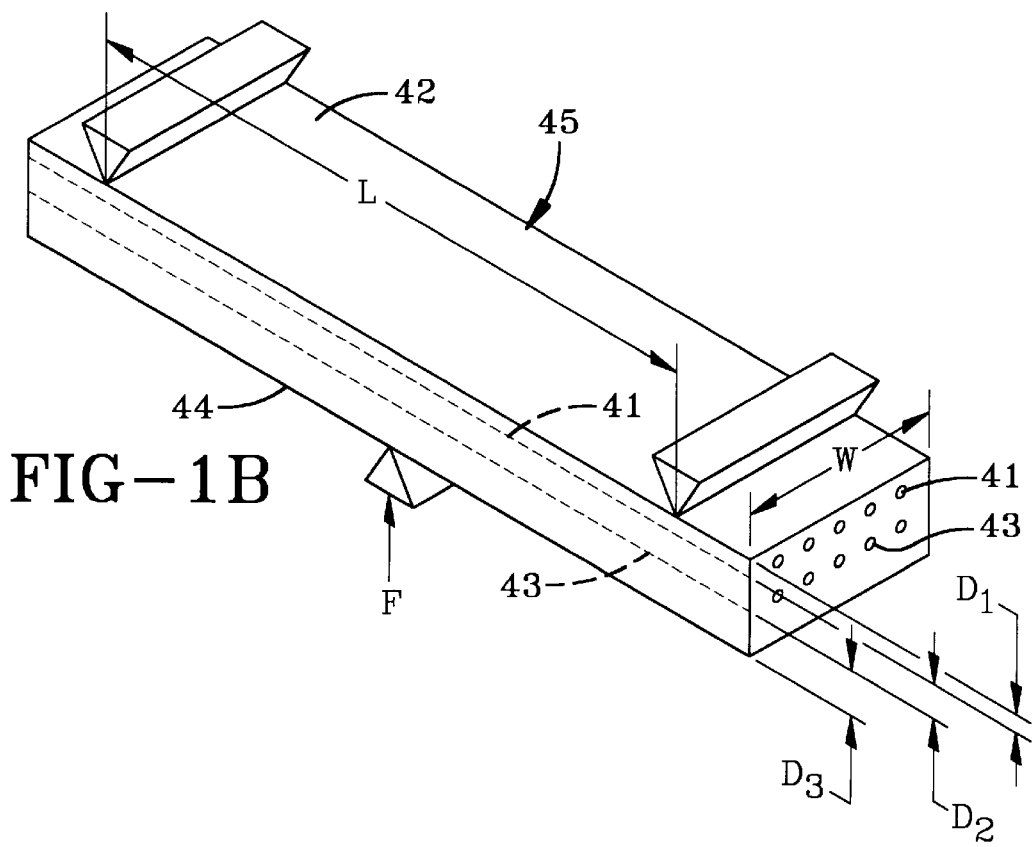

For a better appreciation of the inventive concept a composite test sample structure 45 was constructed as shown in FIGS. 1A and 1B. For simplification the rubber layers were all of the same type with the same properties. The reinforcement parallel cords 41 were located at a depth D1 of 3.1 mm and were rayon cords having a modulus 13 GPa and had an end per inch (epi) count of 30. The reinforcement parallel cords 43 were steel cord of a 1+5× 0.18 mm construction at 18 epi and were oriented parallel to the rayon cords 41 and were embedded in the rubber spaced at a distance D2 of 6.34 mm from the rayon cords 41, the steel cords 43 also being a distance of D3 of 8.32 mm from the bottom of the sample 45. The test sample 45 had a test span or length L at load points of 152.4 mm and a width W of 38 mm. The thickness was the sum D1,D2,D3.

The rectangular test sample 45 was first loaded as shown in FIG. 1A and at a deflection of 10 mm a load of 64N (newtons) was recorded. The sample 45 was then loaded as in FIG. 1B the reversal of the top and bottom loads at the resultant deflection at 10 mm required a load of 136N (newtons). A second test sample identical to the first sample but with only 2 layers of rayon cords 41 was loaded as in FIG. 1A, the resultant load being only 20N (newtons).

The all rayon ply sample 45 is similar to the prior art structures. This test evidenced that a composite have two layers of cords of greatly different modulus can result in a large difference in bending stiffness depending on the direction of load. The load in FIGS. 1A and 1B created a tensioning or compression of the cords 41,43 dependent on the direction the load was applied.

Figure 2A:
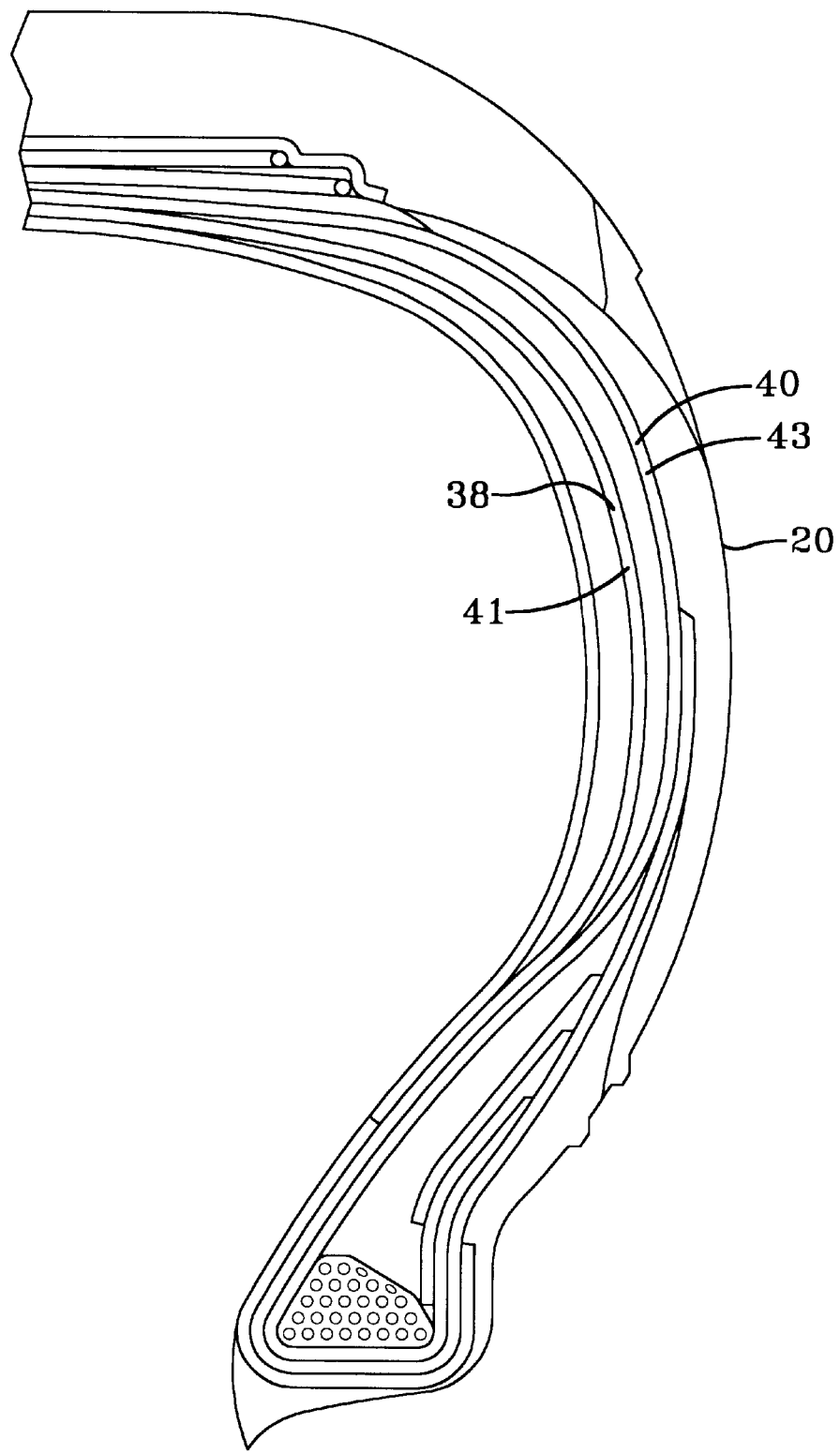
FIGS. 2A, 2B shows cross-sectional views of a tire 10 employing the inventive composite structure.
Figure 2B:
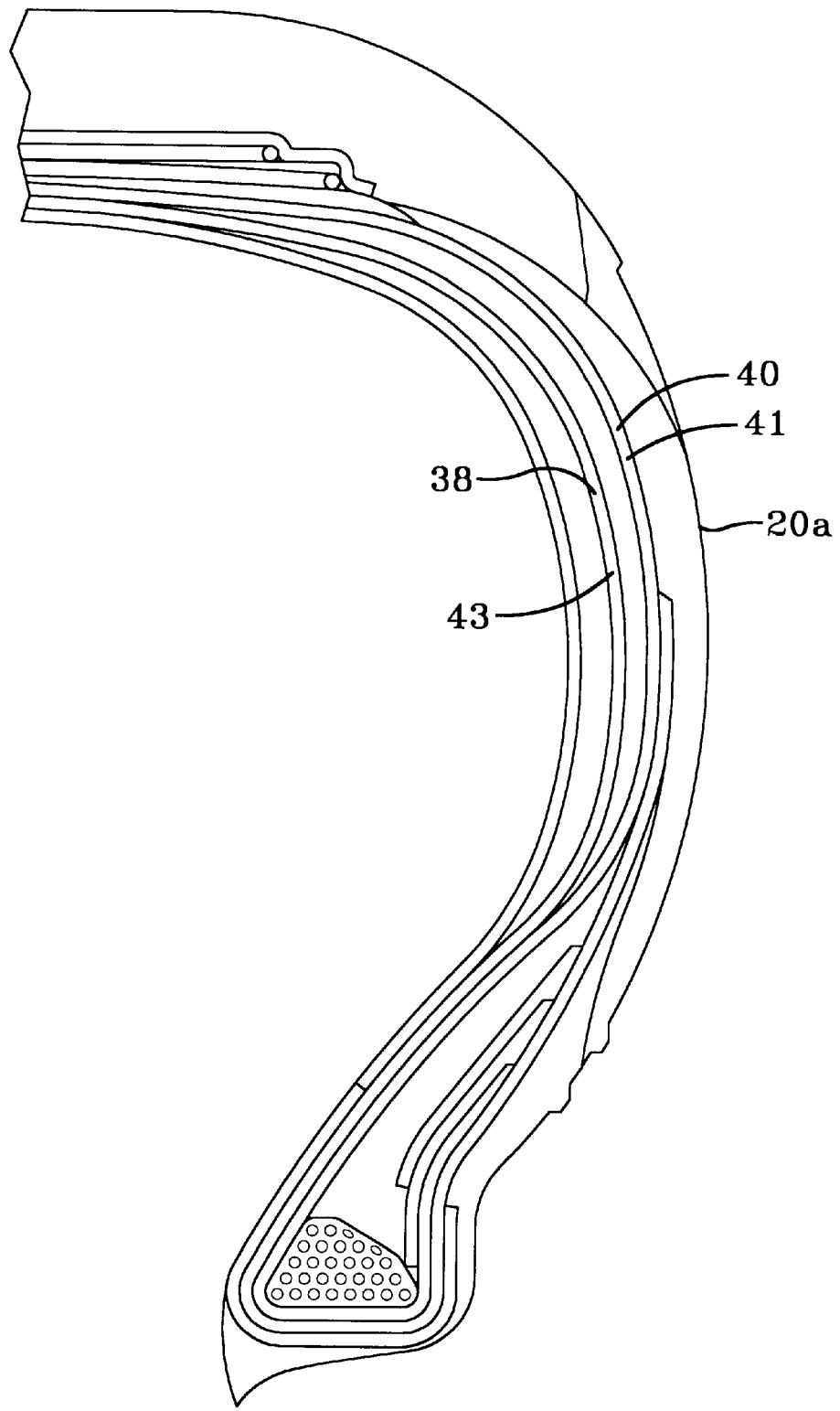

The application of this principal to a test tire of a size P235/55R17 was next tried. The tire 200 of FIG. 3A being the prior art tire similar to the tire 20 of FIG. 2A but having only rayon cords 410,410 in plies 380,400 was used as a control tire. The same construction and size tire was tested in the construction of FIG. 3B wherein the cords 43 of the ply 40 were the 1+5×0.18 mm steel cords having an epi of 18 and being positioned was radially outward of the rayon cords 41 of ply 38 which was the same as the ply 380 of the prior art tire. All other construction materials were the same for the control tire 200 and the first test tire 20. The rayon plied control tire 200 had an effective spring rate at 26 psi of 1516 pounds/inch, at 35 psi a spring rate of 1787 pounds/inch. The first test tire had a 26 psi inflated spring rate of 1541 lbs./in. and at 35 psi a rate of 1816 lbs./in. At 0 psi inflation the spring rate of the first test tire was 773 lbs./in. A second test tire 20a was constructed wherein the rayon cords 41 were placed in ply 40 and were radially outward of the steel cords 43 of the ply 38 as shown in FIG. 3C. This second test tire had spring rates at 26 psi and 35 psi of 1557 and 1847 respectively. At 0 inflation the spring rate of the second test tire was 789 lbs./in.

As can be seen from the application of the concept the array of cords 41 need not be uniformly spaced from the array of cords 43 in order to achieve the bending stiffness differential however the location of maximum spacing will achieve or be the location of maximum stiffness.

As further can be appreciated from the application in a tire the composite structure can be curved or non-linear.

This general inventive principle when applied to an elastomer article means that composite springs or similar shock dampening articles could be made having directional spring rates as a function of cord modulus or elongation.

As further can be appreciated the bending axis A of the structures is located nearest the cords of highest modulus.

While certain representative embodiments and details have been shown for the purpose of illustrating the invention, it will be apparent to those skilled in this art that various changes and modifications may be made therein without departing from the spirit or scope of the invention.

What is claimed is:

1. A composite structure comprising:
   an elastomeric structure, the structure having a first outer surface and a second outer surface, the second outer surface being spaced from the first outer surface;
   a first array of parallel cords having a first modulus E of X and a second array of parallel cords having a second modulus E greater than X, the cords of the first array and second array being encapsulated in the elastomeric material, the cords of the first array being substantially parallel and similarly oriented or aligned relative to the cords of the second array, the first array being spaced from the second array, the first array being positioned between the first outer surface and the second array; and
   wherein the composite structure has a bending stiffness transverse to the first and second arrays, the bending stiffness when a load is applied to the first outer surface being substantially different than when the load is applied to the second outer surface.

2. The composite structure of claim 1 wherein the number of cords of the first array is greater than the number of cords of the second array.

3. The composite structure of claim 1 wherein the cords of the first array have a percent elongation greater than the cords of the second array.

4. The composite structure of claim 3 wherein the cords of the second array are substantially inextensible.

5. The composite structure of claim 1 wherein the first array is not evenly spaced from said second array.

6. The composite structure of claim 1 wherein the composite structure is non-linear.

7. The composite structure of claim 6 wherein the composite structure a component for a pneumatic tire, the component having cord reinforced plies, one ply having cords of a modulus E of X and another ply having cords of a modulus E greater than X.

* * * * *